US007308428B1

(12) United States Patent
Federspiel et al.

(10) Patent No.: US 7,308,428 B1
(45) Date of Patent: Dec. 11, 2007

(54) SYSTEM AND METHOD FOR DISPLAYING MARKET INFORMATION

(75) Inventors: Fred J. Federspiel, Larchmont, NY (US); Henri Waelbroeck, Col. Navarte (MX)

(73) Assignee: Pipeline Financial Group, Inc., New York, NY (US)

( * ) Notice: Subject to any disclaimer, the term of this patent is extended or adjusted under 35 U.S.C. 154(b) by 0 days.

(21) Appl. No.: 09/539,120

(22) Filed: Mar. 30, 2000

(51) Int. Cl.
*G06Q 40/00* (2006.01)
(52) U.S. Cl. .............................. 705/36; 705/35; 705/37
(58) Field of Classification Search ............ 705/35–37; 273/408, 278, 138.2, 256; 235/61 E; 710/48
See application file for complete search history.

(56) References Cited

U.S. PATENT DOCUMENTS

| 5,347,452 A | 9/1994 | Bay, Jr. | |
| 5,689,651 A | 11/1997 | Lozman | |
| 5,809,483 A | 9/1998 | Broka et al. | |
| 5,924,083 A | 7/1999 | Silverman et al. | ............ 705/37 |
| 6,014,643 A | 1/2000 | Minton | |

OTHER PUBLICATIONS

CyBerCorp, Inc, "CyBerTrader 2.1, Trader's Workstation An Integrated Trading Environment" cybercorp.com, published Feb. 2000 (total of 4 pages).*
Electronic Trading Guide for NASDAQ Level 2, Jul. 1999 by www.tradingacademy.com (total of 6 pages).*
Jaime Cuevas Dermody; Eliezer Z. Prisman "No Arbitrage and Valuation in Markets with Realistic Transaction Costs", The Journal of Financial and Quantitative Analysis > vol. 28, No. 1 (Mar. 1993), pp. 65-80.*
Price Discovery and Learning During the Preopening Period in the Paris Bourse Bruno Biais; Pierre Hillion; Chester Spatt The Journal of Political Economy > vol. 107, No. 6, Part 1 (Dec. 1999), pp. 1218-1248.*
CyBerTrader—Trader's Workstation An Integrated Trading Environment, CyBerCorp, Inc., Feb. 2000 Ver. 2.1.*

* cited by examiner

*Primary Examiner*—Harish T. Dass
(74) *Attorney, Agent, or Firm*—Morgan, Lewis & Bockius LLP; Steven D. Underwood, Esq.

(57) ABSTRACT

The subject invention overcomes the limitations of known market data displays by producing a graphical market display that integrates analysis of both 1) intra-day trading activity by classes of market participant, and 2) projected market impact as a function of trade size give the present set of executable orders in an electronic securities trade execution network. In a preferred embodiment, the display is used as the graphic user interface (GUI) of an ECN. In alternate preferred embodiments, the display is offered by a market data analysis service that accesses information form one or more ECNs, exchanges, or stock market. In another alternate embodiment, the display is created by software on a user computer form liquidity information already on that user computer.

27 Claims, 14 Drawing Sheets

FIG. 3

| TK | KGK | Chg | -1 3/16 | Hi | 22 3/4 |
|---|---|---|---|---|---|
| Last | 21 15/16 | Vol | 234,500 | Low | 21 7/8 |

Buy

| Price | Quantity | Minimum |
|---|---|---|
| 21 7/8 | 12,100 | 0 |
| 21 13/16 | 1,700 | 0 |
| 21 3/4 | 43,200 | 10,000 |
| 21 11/16 | 1,100 | 0 |
| 21 5/8 | 14,900 | 0 |
| 21 9/16 | 1,000 | 0 |
| 21 1/2 | 132,000 | 25,000 |
| 21 7/16 | 500 | 0 |
| 21 3/8 | 1,000 | 0 |
| 21 5/16 | 700 | 0 |
| 21 1/4 | 100,000 | 25,000 |
| 21 3/16 | 300 | 0 |
| 21 1/8 | 4,800 | 0 |
| 21 1/16 | 5,000 | 0 |
| 21 | 100,000 | 25,000 |

Sell

| Price | Quantity | Minimum |
|---|---|---|
| 21 15/16 | 8,000 | 0 |
| 22 | 37,500 | 20,000 |
| 22 1/16 | 1,000 | 0 |
| 22 1/8 | 2,300 | 0 |
| 22 3/16 | 12,600 | 0 |
| 22 1/4 | 48,700 | 0 |
| 22 5/16 | 22,100 | 0 |
| 22 3/8 | 2,300 | 0 |
| 22 7/16 | 500 | 0 |
| 22 1/2 | 33,000 | 15,000 |
| 22 9/16 | 300 | 0 |
| 22 5/8 | 800 | 0 |
| 22 11/16 | 3,600 | 0 |
| 22 3/4 | 8,000 | 0 |
| 22 13/16 | 100 | 0 |

SYSTEM AND METHOD FOR DISPLAYING MARKET INFORMATION

FIELD OF THE INVENTION

The subject invention relates to a method and system for displaying the status of one or more electronic securities trading markets, and more particularly to a method and system for displaying said status over a computer network such as the Internet.

BACKGROUND OF THE INVENTION

There has recently been dramatic growth in the number and volume of securities transactions executed over electronic communication networks (ECNs). On an ECN, market participants can access market information and communicate orders to a central order-execution mechanism. The explosive growth of retail and professional trading over the Internet has extended access to ECN liquidity to new and distinct classes of market participants beyond traditional market professionals and institutional investors. ECNs have also developed the ability to manage and execute many order types and to dynamically manage complex baskets of many orders in near real-time. These developments have made ECNs ubiquitous, fast, and flexible and have created a dynamic market environment with a rapidly changing book of executable orders.

In a typical ECN trading situation where a market participant has a buying or selling interest, liquidity conditions can make it very difficult to determine the market impact of a potential order. The critical questions are whether sufficient counter-interest exists in the book of executable orders or quotes to complete the potential order, and if so, at what average price that order would execute (referred to herein as the order's "market impact"). Existing methods of generating and displaying liquidity information and market impact analysis fail to adequately provide an answer to these questions. For example, a display of the inside quote (the price and volume of the highest bid and lowest offer available in the book of executable orders) only provides an answer if the potential trade is of a smaller size than the displayed counter-interest.

There has been a dramatic increase in the number of market participants who instead perform this analysis from a display of the full depth of quote in a securities market, because ECNs freely disseminate such information and more market participants are paying for the information from markets such as NASDAQ. A display of the full depth of quote, such as the typical display depicted in FIG. 3, may provide enough information to manually calculate market impact, but as a practical matter it is difficult, if not impossible, to manually perform such calculations in real-time. Use of the order array depicted in FIG. 3 to deduce market impact requires a trader to process large quantities of rapidly changing raw numeric data while simultaneously making broader transaction decisions. This difficulty is compounded if the trader is analyzing several order arrays for various securities of interest. The process is further complicated by non-obvious non-linear execution rules relating to orders with minimum volume restrictions. Also, the equity market as a whole has experienced a significant upward trend in both trading volume and volatility over the past five years, adding to the kinetic pace of change in instantaneous liquidity and therefore increasing the need for rapid market impact analysis. Furthermore, if decimal equity pricing is adopted in the United States (as planned), the order array depicted in FIG. 3 will become even more disperse and difficult to analyze.

A known approach to analyzing market impact is disclosed in U.S. Pat. No. 5,924,083, to Silverman, et al., which discloses a trading system that attempts to hypothetically fill a potential order using the executable order book, and displays to the user the weighted average price at which the potential order would be executed. This provides numerical display of average prices and requires iterative user input to generate estimated execution prices for multiple potential trade sizes; in an alternate embodiment, the system provides numerical display of average price for a handful of system-defined standard sizes. In either embodiment, the system disclosed in Silverman et al. fails to provide the average price as a piecewise-continuous function of trade size—at most it gives a sample of numerical values, without any graphical display or integration with other market information.

Another important factor in trade decision-making is intra-day market activity. Traders constantly monitor sources of market activity data to locate opportunities presented by changes in demand and liquidity patterns, short term imbalances of supply and demand, or other developments that can be identified by keeping abreast of market activity. Existing sources of this information typically express total volume traded or price action (whether last trade or best bid and offer) as a function of time, or both together. These systems are well known in the art and can be found, e.g., at Bloomberg.com or Finance.Yahoo.com. Existing market information systems simply access trade history and do not identify or classify the executing brokers on either side of the transaction. The typical combined price volume display described above fails to separate the trading activity of different classes of market participants, which often react very differently both temporally and substantively to market price action and information dissemination. The ability to separately view trading activity by market participant class produces a much clearer picture of market dynamics, and analysis of the reaction patterns of such market participant classes can have crucial predictive value.

SUMMARY OF THE INVENTION

The subject invention overcomes the limitations of known market data displays by producing a graphical market display that integrates analysis of both 1) intra-day trading activity by classes of market participant, and 2) projected market impact as a function of trade size given the present set of executable orders in an electronic securities trade execution network. In a preferred embodiment, the display is used as the graphic user interface (GUI) of an ECN. In alternate preferred embodiments, the display is offered by a market data analysis service that accesses information from one or more ECNs, exchanges, or stock market. In another alternate embodiment, the display is created by software on a user computer from liquidity information already on that user computer.

In order to generate the projected market impact analysis, a preferred embodiment accesses and performs real-time calculations on the book of executable orders contained in the ECN. The display simultaneously expresses the price at which the user can expect to either buy or sell a given number of shares at that particular moment. To generate the two curves of the market impact analysis display, the preferred embodiment fills a hypothetical order with the executable order book, and calculates the weighted average price at which the order would be executed. This hypothetical execution and calculation is repeated to generate two curves that assimilate in real-time all available data regarding liquidity and distill that data into a novel graphical representation of expected market impact. An alternate embodiment also includes a marginal execution price function for both the bid and offer curves. Another alternate embodiment incorporates user trading costs into the calculation of the market impact analysis display.

In order to generate the intra-day trading analysis, the system of a preferred embodiment accesses historical trade and market data including time, price, and quantity for each trade, and best bid and best offer as a function of time. One preferred embodiment generates a display similar to that depicted in FIG. 4. Another preferred embodiment performs further analysis, separating the trade volume data into market participant classes that are defined by the system as shown in FIG. 5 (by the user, in an alternate embodiment). The system separates the trade data using an Indicative Formula (IF) for each market participant class and plots the time-bucketed value of each IF as a function of time. This additional analysis is based on data from the data source (ECN, exchange, or other stock market) identifying the class of the executing broker for each trade. An alternate embodiment also calculates and displays information regarding the price of trading activity relative to the best executable order prices. Another preferred embodiment also displays information regarding the range of market maker bids and the range of market maker offers. Another preferred embodiment also calculates and displays information regarding the estimated change in market maker inventory.

The preferred embodiment integrates these separate analyses into a single display that the system configures with respect to scale, format, and content. In the preferred embodiment of the invention, the intra-day market activity analysis display is on the left side of the main display, and the market impact display is on the right side of the main display. In this embodiment, the system generates an appropriate scale for the shared vertical price axis as well as the horizontal time axis for the market activity analysis and the horizontal trade size axis for the market impact analysis. In order to maintain a meaningful and condensed representation of market information, the display can be re-scaled as market activity dictates.

BRIEF DESCRIPTION OF DRAWINGS

FIG. 3 is a depiction of a traditional order book display.

DETAILED DESCRIPTION OF PREFERRED EMBODIMENTS

Figure 1:
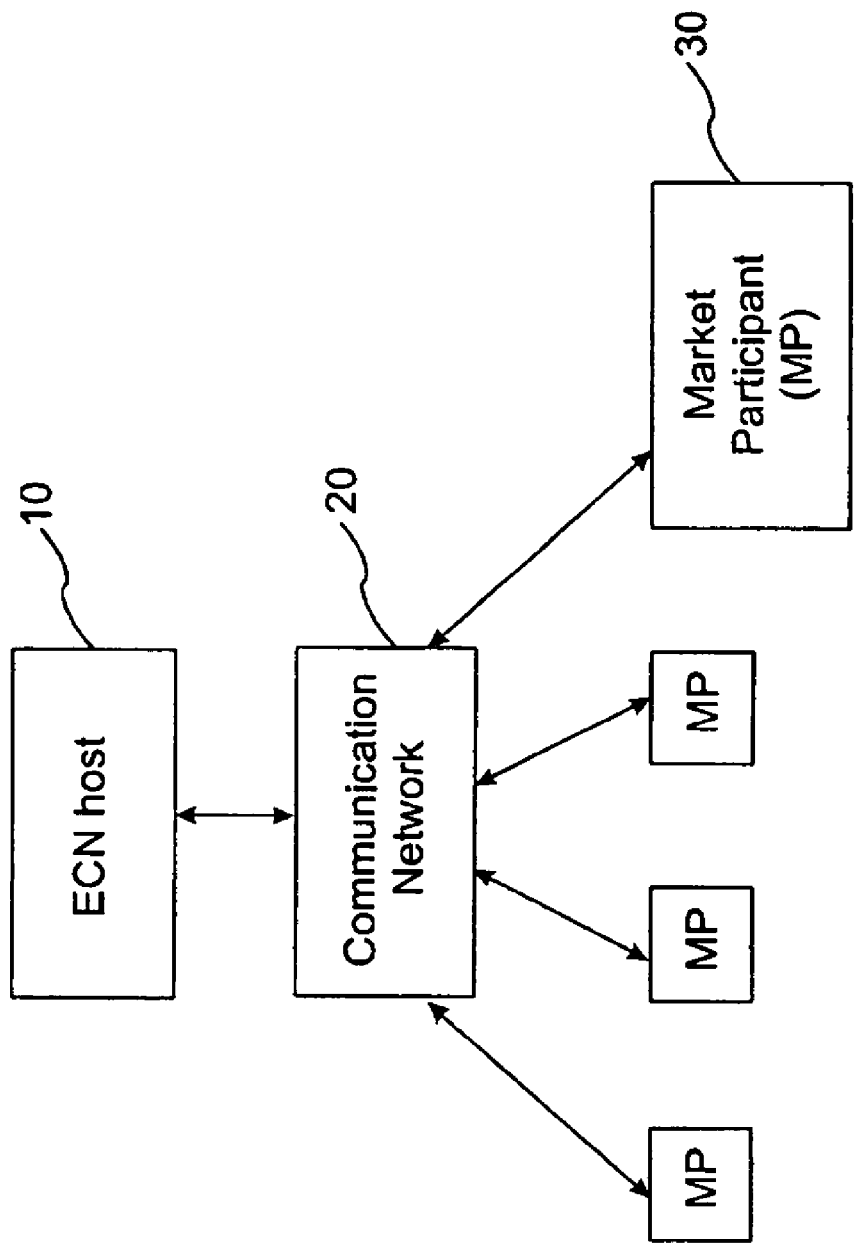
FIG. 1 is a schematic diagram depicting a preferred embodiment of the system of the subject invention.
Figure 2:
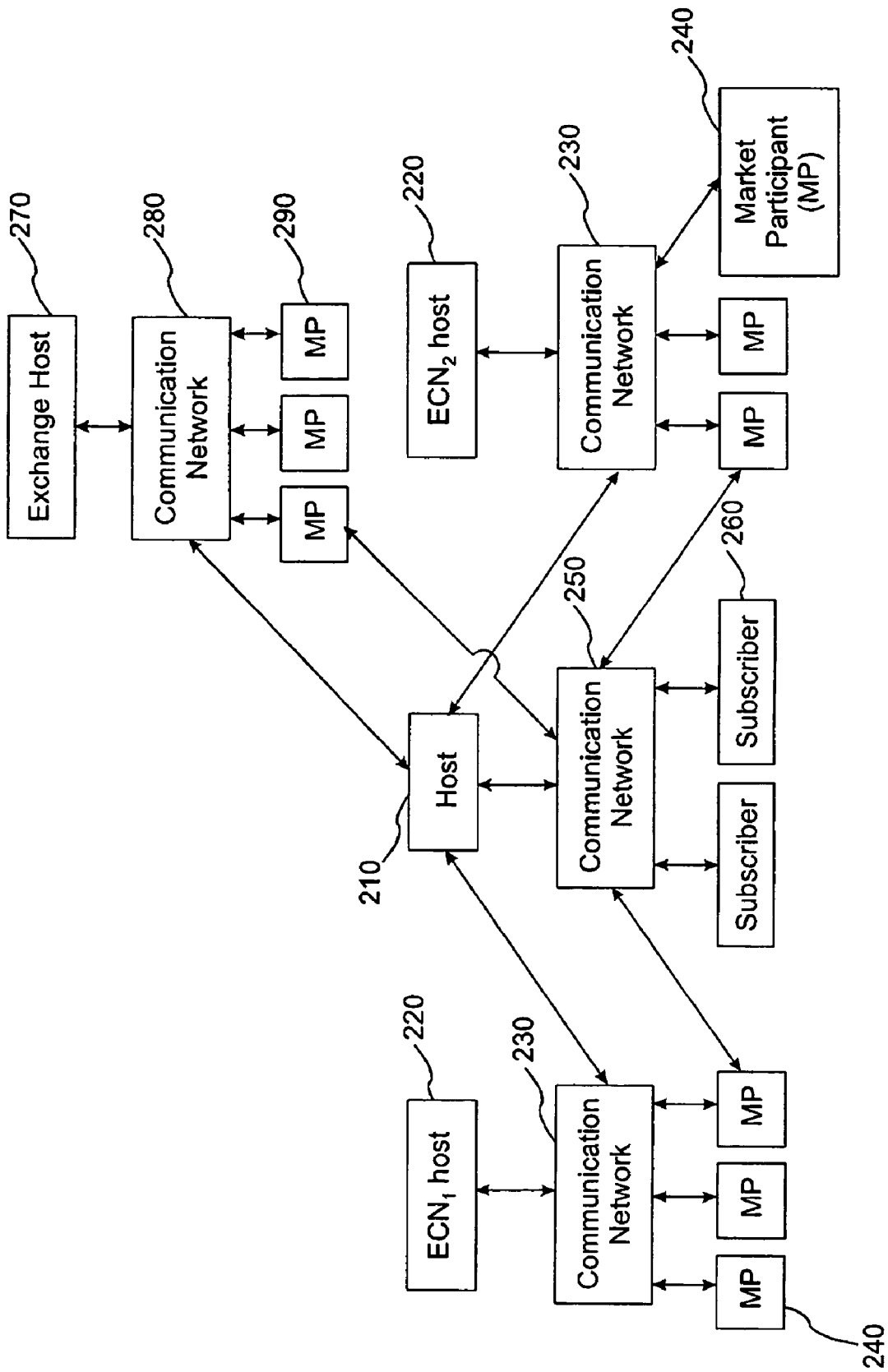
FIG. 2 is a schematic diagram depicting an alternate preferred system embodiment of the subject invention.

FIG. 1 and FIG. 2 illustrate two system configurations corresponding to preferred embodiments of the subject invention. Each configuration comprises a graphic user interface (GUI) integrated with an ECN and further comprises a network host (ECN host) 10, a communications network 20, and a plurality of market participants 30. Market participants 30 (also referred to herein as "users") access information regarding trading activity and the array of executable orders on the ECN host 10. Users transmit, modify, and cancel executable orders through the communication network 20. In the first preferred embodiment (shown in FIG. 1), the communication network 20 is the Internet but, as is known in the art, alternate embodiments can employ dedicated communication networks. The preferred embodiment permits market participants 30 to view information regarding trading activity and executable orders either in their traditional form as depicted in FIG. 3 or through the integrated graphical market analysis display of the subject invention. In the preferred embodiment, this display is created by the host 10 and transmitted to the market participant 30. In an alternate embodiment, the host 10 transmits either raw or processed data through the communication network 20 to be processed and assimilated into the display of the subject invention by local software at the market participant level 30 as is known in the art. In a further alternate embodiment, the display is created at the host site and then shown on a remotely located website (preferably operated by a third-party vendor) that is accessed by customers. Further combinations of the above elements will be clear to those skilled in the art. For example, display software could be located at a remote website that receives data from the host 10. Also, the display could be created by software on a user computer from liquidity information already on that user computer, either from the host or from a third party vendor.

In a second preferred embodiment, depicted in FIG. 2, the system is external to the ECN whose data the system analyzes and displays. The host 210 communicates with various ECNs 220 through each of their respective communication networks 230. In the preferred embodiment described in FIG. 2, the communication networks 230 are the Internet, but alternate preferred embodiments employ dedicated communication networks, as is known in the art. A host 210 accesses information regarding trading activity and executable orders generated by each ECN's market participants 240. The host 210 then processes the data and generates an integrated graphical market analysis display to be provided to subscribers 260 through a communication network 250. As in the system described in FIG. 1, this network 250 is the Internet, but alternate embodiments employ a dedicated communication network. As is shown in FIG. 2 many of the ECN market participants 240 may also be subscribers 260 to the subject system. In the preferred embodiment, the display of the subject invention is created by the host 210 and transmitted to the subscriber 260. In an alternate embodiment, the host 210 transmits either raw or processed data through the communication network 250 to be processed and assimilated into the display of the subject invention by local software at the subscribe level 260 as is well known in the art. Further embodiments will be apparent from the examples given above regarding FIG. 1.

The embodiments of the subject invention described in FIG. 1 and FIG. 2 are not intended to be exhaustive. Further embodiments of the subject invention will be apparent to those skilled in the art. For example, in an alternate preferred embodiment the subscribers 260 have the ability to select the sources of data to be included in the display: a subscriber with access only to ECN1 and ECN3 may wish to limit the display of trading activity and/or of market impact to information from these two sources. Another preferred embodiment of the subject invention not only provides news and analysis including the integrated display of the subject invention, but also enables subscribers 260 to execute orders by routing their orders among the various affiliated ECNs 220 through their respective communication networks 230. In another embodiment, the system and method is applied to trading activity and executable orders on an exchange 270 or other stock market by accessing the trade history and exchange order book via the same communication network 280 that connects the exchange 270 to market participants 290 who electronically route orders to the exchange order book. Once again, these market participants 290 may also be subscribers 260 to the system.

Figure 4:
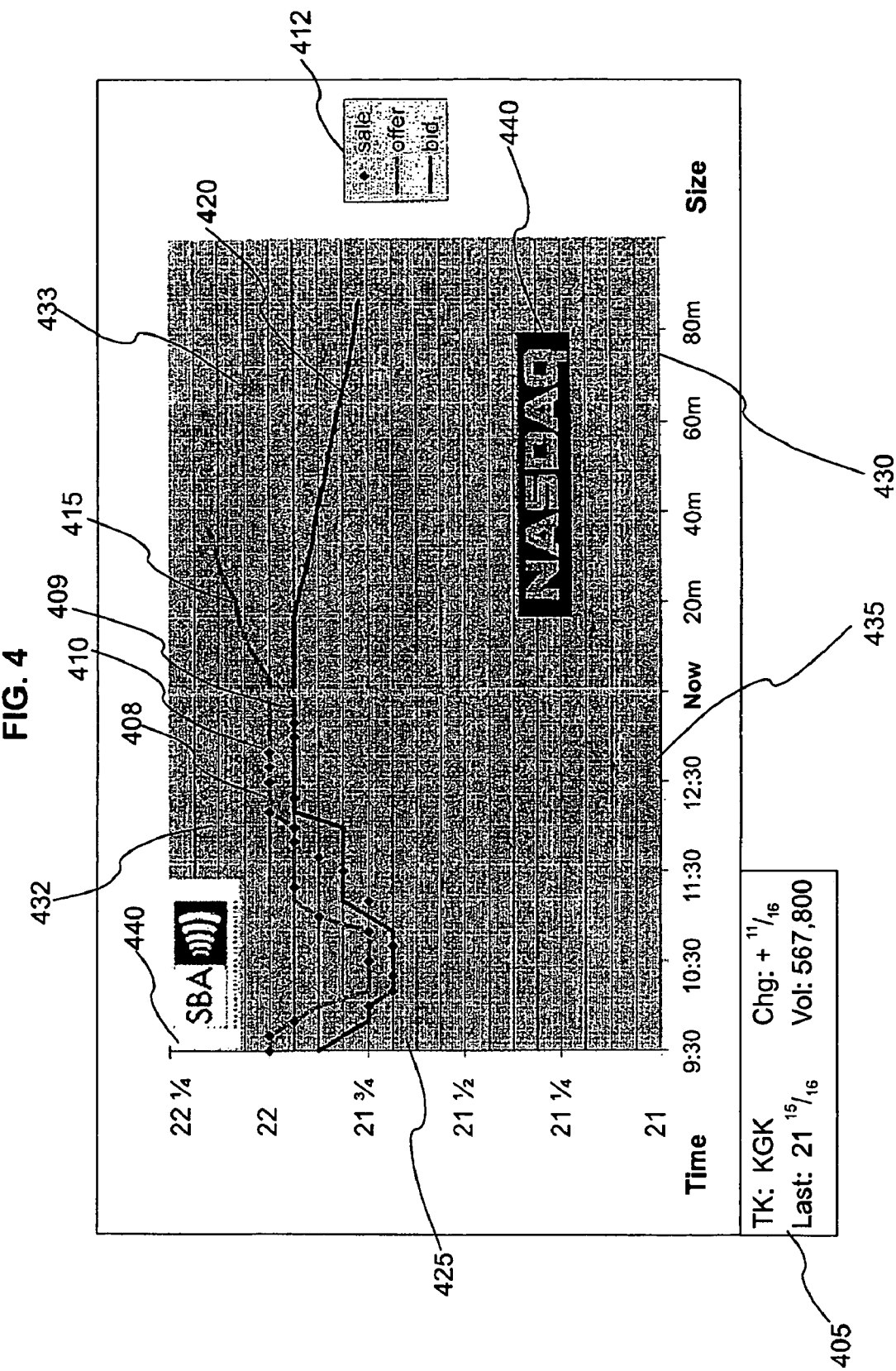
FIG. 4 is a depiction of a basic main display of a preferred embodiment.

FIG. 4 depicts a preferred embodiment of the subject invention, comprising a market activity analysis display 432 on the left side of the main display, a market impact analysis display 433 on the right, and an alphanumeric market information summary display 405 at the lower left of the main display. In alternate preferred embodiments, the summary display 405 can be configured by the user or by the system, so as to include selected alphanumeric market data. In the preferred embodiment depicted in FIG. 4, commercial information tiles 440 are used as a branding device for the underlying ECN source (in FIG. 4, NASDAQ) and as an advertisement for the corporation whose securities are being analyzed (in FIG. 4, SBA). Alternate embodiments use the commercial branding tiles 440 as advertisement for another external entity.

In the embodiment depicted in FIG. 4, the market activity information comprises a continuous graph 408 of best offer and a continuous graph 409 of best bid, as well as discrete indications 410 of trade prices, each expressed as a function of time and identified in the display legend 412. The market activity analysis display 432 is similar to the typical form generated from the consolidated tape that are well known in the art. In an alternate preferred embodiment, the user can also view the last trade price as a flashing red dot on the dividing line between the market impact analysis display 433 and the market activity analysis display 432.

In order to generate the projected market impact analysis display 433 depicted on the right side of FIG. 4, the preferred embodiment accesses and performs real-time calculations on data regarding all executable trading interests. While the generation of this market impact analysis display 433 is described below in the context of a book of executable orders contained in an ECN, it is obvious to one skilled in the art that the analysis can also be applied to executable market maker quotes. The display shows to a user the price at which the user could expect to transact if the user's market order were executed at that particular moment. As shown in FIG. 4, the preferred embodiment simultaneously displays this price as a curve 415 that is a function of trade size for user bids trading with the book of executable offers and a curve 420 that is a function of trade size for user offers trading with the book of executable bids. To generate the two piece-wise continuous (continuous except for a finite number of discontinuities) curves, the system and method of a preferred embodiment fills a hypothetical order using booked executable orders, and calculates the weighted average price at which the order would be executed. This hypothetical execution and calculation is repeated for many different trade sizes to generate the two curves 415 and 420 that instantly assimilate all available execution data and distill it into a novel graphical representation of expected market impact.

The curves represent the maximum average price a buyer should expect to pay or the minimum average price a seller should expect to receive for their order as a function of trade size. If the only executable orders in the market are the public orders from which the market impact curves are calculated and those orders do not change before the user's order is transmitted and executed, then the output of the invention will be the precise average execution price for an order of that size. Any non-public orders (orders for which none or only a portion of the volume is publicly displayed) in the ECN order book that are executed in the process of filling the order must have the same or a better price relative to the public orders from which the invention calculated the projected market impact. Therefore, the average price of the user's actual execution can only be the same or better relative to the market impact curve produced by the invention if the executable order book remains constant. These market impact curves do not guarantee any specific fill to the user of the invention, however, as the order book contents are changing constantly; booked orders can trade or can be added, canceled, or modified before the user's order is entered, transmitted, and executed.

Figure 8:
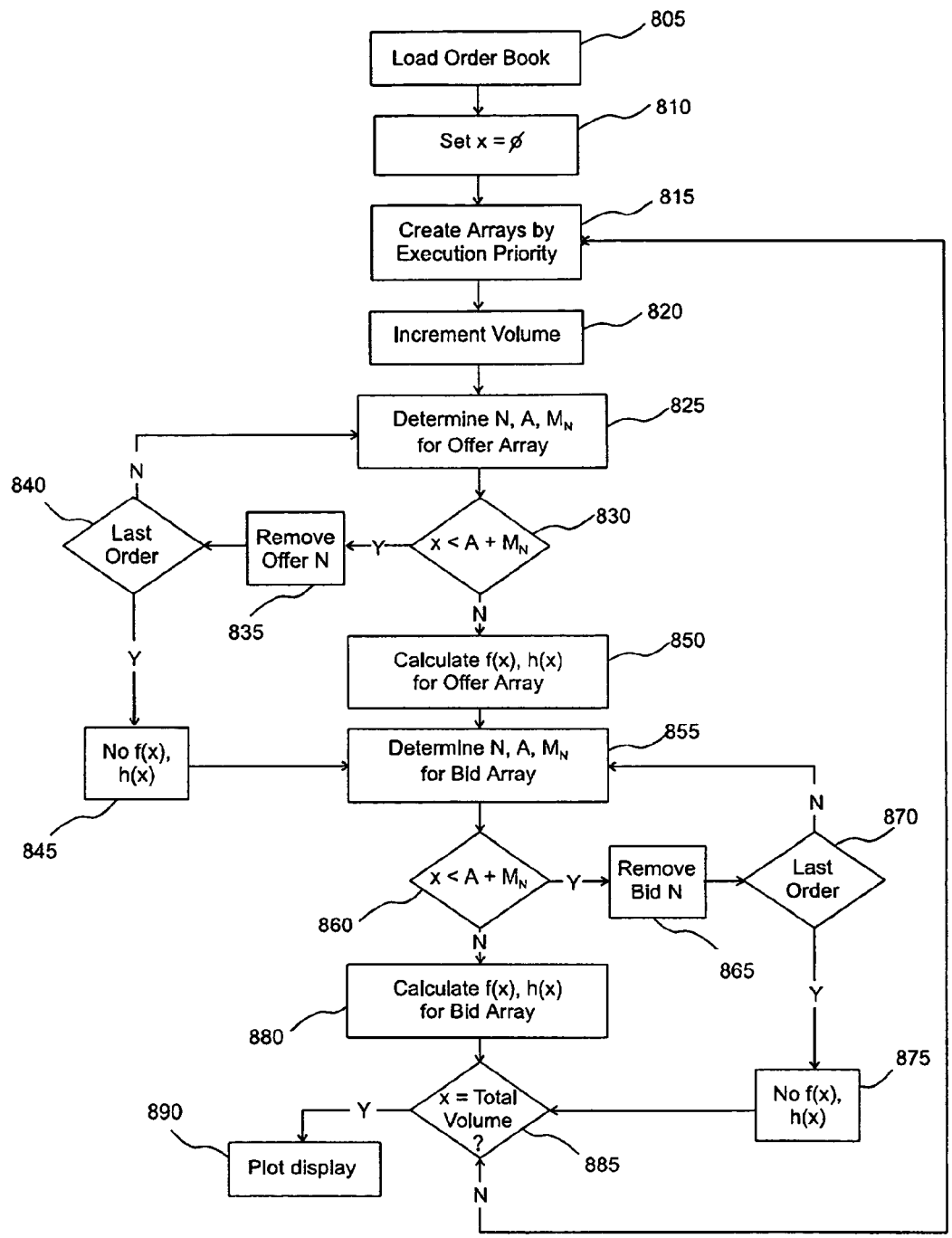
FIG. 8 is a flowchart showing steps of a preferred method of producing a market impact analysis display.

FIG. 8 is a flow diagram showing the operation of software of a preferred embodiment to generate the market impact curves. At step 805, a system host 10 accesses a book of public executable orders in the ECN, and at step 810, the software creates a volume counter x which it initializes to zero. At step 815, data representing the book of public executable orders is placed into two arrays of decreasing execution priority, one for bids and one for offers. Each element i of the arrays represents an order and includes the price, volume, and minimum quantity ($P_i$, $V_i$, $M_i$) for that order. The execution priority for the offer and bid arrays is set according to the execution rules of their source (ECN, exchange, or other stock market). This priority is set primarily according to price; priority among orders at the same limit price typically starts with order entry time and is modified by various rules regarding order size and type (e.g., market orders, minimum quantities). Once again, while this describes the creation of offer and bid arrays from a book of executable orders contained in an ECN, it is obvious to one skilled in the art that the analysis can be extended to executable market maker quotes.

The software then performs an outer loop that calculates the market impact price from the offer and bid arrays for an order of volume x and continues to increment the volume counter x as depicted in step 820 up to the total volume contained in the bid and offer arrays. In step 825 the software of the preferred embodiment then determines the following values from the offer array ($P_i$, $V_i$, $M_i$):

$$N = N(x) \text{ is chosen so that } x \in \left(\sum_{i=1}^{N-1} V_i, \sum_{i=1}^{N} V_i\right),$$

$$A = \sum_{i=1}^{N-1} V_i, \text{ and}$$

$M_N$ = minimum quantity of offer $N$.

In step 830 the software determines whether $x < A + M_N$. If so, then a bid of volume x can not use offer N because the remaining volume after executing all previous orders is insufficient to meet the minimum quantity of offer N. Offer N is therefore removed from the array in step 835, and the software determines in step 840 whether it was the last order in the offer array. If it was not, then the software repeats the loop starting with step 825 to determine whether volume x can be executed with the new offer array. If offer N was the last order in the offer array, then it is not possible to execute a market order to buy x shares given the offer array, and in step 845 the market impact $f(x)$ is determined not to exist. If in step 830 the software determined that $x \geq A + M_N$, then in step 850 the software calculates the market impact $f(x)$ for a market order to buy x shares from the offer array ($P_i$, $V_i$, $M_i$) in the following manner:

$$f(x) = \frac{\sum_{i=1}^{N-1} P_i V_i + P_n\left(x - \sum_{i=1}^{N-1} V_i\right)}{x}.$$

For example, if 10,000 shares are offered for sale at $100/share, 10,000 shares are offered at 100¼ per share, and 20,000 are offered at 100⅛ per share, then the offer array ($P_i$, $V_i$, $M_i$) will be:

| i | ($P_i$; $V_i$; $M_i$) |
|---|---|
| 1 | (100; 10,000; 0) |
| 2 | (100⅛; 20,000; 0) |
| 3 | (100¼; 10,000; 0) |

Thus, if x=34,000 shares, then N=3 and $$f(x) = [100(10,000) + 100^{1/8}(20,000) + 100^{1/4}(4,000)] / 34,000$$
$$= (1,000,000 + 2,002,500 + 401,000)/34,000$$
$$= 3,403,500/34,000$$
$$\approx 100.1029$$

As explained above, this figure represents the maximum average price per share that a prospective buyer will expect to pay for a market order to purchase 34,000 shares given this offer array.

It is important to note from the conditional determinations described above that a minimum quantity order can create significant discontinuities in the average execution price as a function of trade size. The integrated visual display of these discontinuities yields an accurate instantaneous assessment of market impact in situations in which a mental numerical analysis from an order array such as that depicted in FIG. 3 would be extremely difficult, if not impossible.

In the preferred embodiment, once the market impact on the offer array of a buy order of volume x has been determined, the software performs the same analysis on the bid array for a sell order of volume x. In step 855, the software determines N(x), A, and $M_N$ from the bid array ($P_i$, $V_i$, $M_i$) as described above. In step 860 the software determines whether $x < A + M_N$. If so, bid N is therefore removed from the array in step 865, and the software determines in step 870 whether it was the last order in the bid array. If it was not, then the software repeats the loop starting with step 855 to determine whether volume x can be executed with the new bid array. If it was, then it is not possible to execute a market order to sell x shares given the bid array, and in step 875 the market impact $f(x)$ is determined not to exist. If in step 860 the software determined that $x \leq A + M_N$, then in step 880 the software calculates the market impact $f(x)$ for a market order to sell x shares to the bid array in the manner described above. In step 885, the software of the preferred embodiment determines whether the volume counter x has reached the total volume of the order book. If it has not, the outer loop is performed again starting at step 815, where the offer and bid arrays are reconstructed, replacing any order which had been removed; if it has, the market impact display is plotted in step 890.

In an alternate preferred embodiment, the prices in the offer and bid arrays are adjusted to account for the users's direct trading costs in the calculation of market impact. The offer array ($P_i$, $V_i$, $M_i$) will become ($P_i$+C(x), $V_i$, $M_i$) and the bid array ($P_i$, $V_i$, $M_i$) will become ($P_i$−C(x), $V_i$, $M_i$), where C(x) represents the per share cost to the user to execute a trade of volume x. This direct trading cost could be a broker commission for a retail user, or a per-share matching cost in a facility such as Optimark. The user can also choose to input a flat fee per trade, in which case the software of this preferred embodiment converts the flat fee into a cost per share by dividing by the total trade size x, making $$C(x) = \frac{FlatFee}{x} + Costspershare.$$

In another alternate preferred embodiment, the system analyzes all legal combinations of executable orders to determine the set of orders which generates the most favorable average execution price. This optimization can be significant if the market impact analysis is being performed on fragmented pools of liquidity (e.g. multiple ECNs) where a market participant can choose to execute different portions of an order in different pools of liquidity. It can also be significant in a single pool of liquidity in which the execution priority rules do not preclude an order with a less aggressive price from being executed before an order with a more aggressive price (i.e. a market such as the NASDAQ dealer market which permits such "trade-throughs"). The optimized order set can be determined by exhaustive search or by more efficient algorithms as are known in the art. The resultant optimized set will exclude certain orders with minimum quantities which, if executed in their execution priority, would increase the average execution price of a buy order at volume x. For example, if 10,000 shares are offered at $100 per share with a minimum quantity of 10,000; 100,000 shares are offered at $100 per share with a minimum quantity of 100,000; and 100,000 shares are offered at $100⅛ per share with no minimum quantity, the offer array will be:

| i | ($P_i$; | $V_i$; | $M_i$) |
|---|---|---|---|
| 1 | (100; | 10,000; | 10,000) |
| 2 | (100; | 100,000; | 100,000) |
| 3 | (100⅛; | 100,000; | 0) |

Given this offer array and execution priority, the average execution price for an order to buy 105,000 shares is lower if offer number 1 is not executed; order number 1 will therefore be excluded from the optimized offer set array.

The integration of the trading activity analysis display and the market impact analysis display into a meaningful single main display requires a method for choosing appropriate and consistent scales for the curves of the two displays.

Referring again to FIG. 4, in a preferred embodiment the scale of the trade size axis 430 is chosen such that the maximum displayed size is greater than the larger of the total volume in the bid and offer arrays. Other preferred embodiments give the option of employing other scaling methods to maintain a meaningful display in various market conditions or to satisfy specific user needs. For example, another embodiment sets the scale 430 to isolate a user- or system-defined range, which is useful when the user is only interested in a specific range of trade sizes. Another embodiment sets the scale 430 such that the maximum displayed size is greater than the larger of the total volume of only those orders in the bid and offer arrays that fall within a certain price range (i.e., excluding orders that are outside a user- or system-defined reasonable price range). Another embodiment sets the scale 430 such that the maximum displayed size is greater than the smaller of the total volumes contained in the bid and offer arrays (to maintain a meaningful display if there is a substantial imbalance between total executable public buying and selling interest). A further alternate embodiment enables a user to chose between all of these and/or other scaling options.

In the display of a preferred embodiment shown in FIG. 4, the horizontal time axis 435 in the market activity analysis display is set to include in the allotted space the entire trading day up to the last price update. This scale is reset whenever new price information arrives, which may be either in real-time or after a system-defined delay. It will be clear to those skilled in the art that alternate embodiments of the subject invention could employ other methods to set the horizontal time axis 435.

Figure 9:
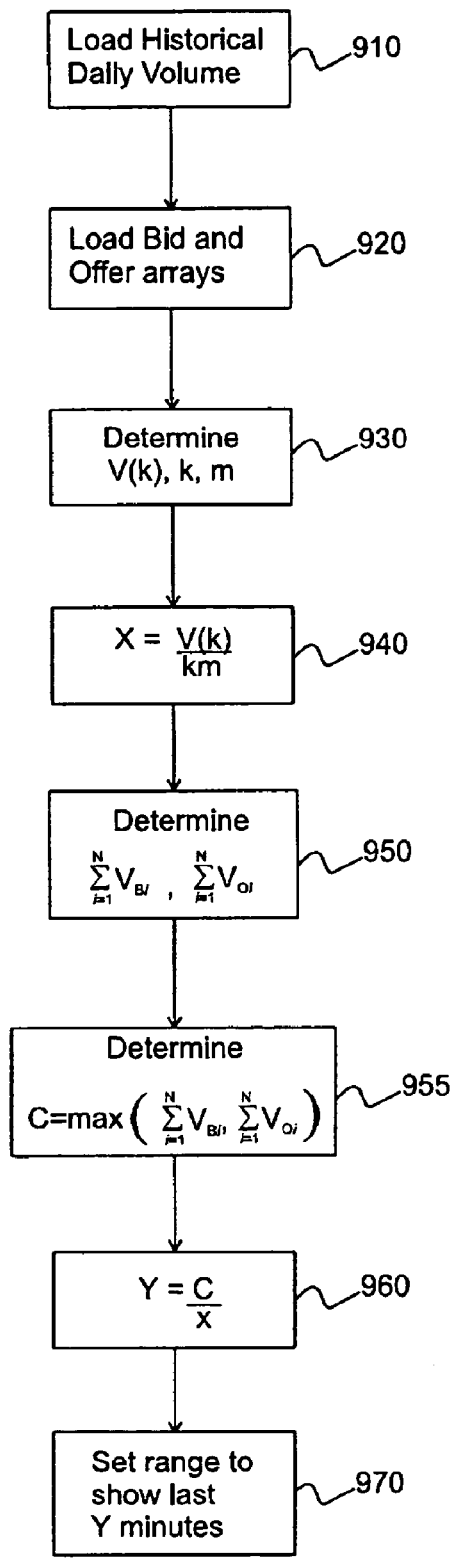
FIG. 9 is a flowchart showing steps of a method employed by an alternate embodiment for determining the horizontal scale of the market activity analysis display.

FIG. 9 is a flow diagram showing the operation of software used in such an alternate preferred embodiment to set the scale of the horizontal time axis 435 to include in the allotted space the amount of time Y expected to execute the volume in the bid or offer arrays based on recent trading history. In step 910, the system accesses data regarding historical daily volume totals and in step 920 accesses data regarding the current arrays of executable bids and offers. In step 930, software of the preferred embodiment determines the total volume V(k) traded in the security in the last k days and the number of minutes m in a trading day. In step 940, the recent average trading volume by minute x is calculated as $$x = \frac{V(k)}{km}.$$

In step 950, the total volumes of the bid and offer arrays are calculated as $$\sum_{i=1}^{N} V_{B_i} \text{ and } \sum_{i=1}^{N} V_{O_i},$$

respectively. In step 955, the software determines the larger total volume between the bid and offer array as $$C = \max\left(\sum_{i=1}^{N} V_{O_i}, \sum_{i=1}^{N} V_{B_i}\right).$$

In step 960, the expected number of minutes Y it will take to execute the bid or offer array is calculated as $$Y = \frac{C}{x}.$$

In step 970, the software sets the horizontal time axis 435 in the market activity analysis display to include in the allotted space the last Y minutes of trading activity.

Figure 10:
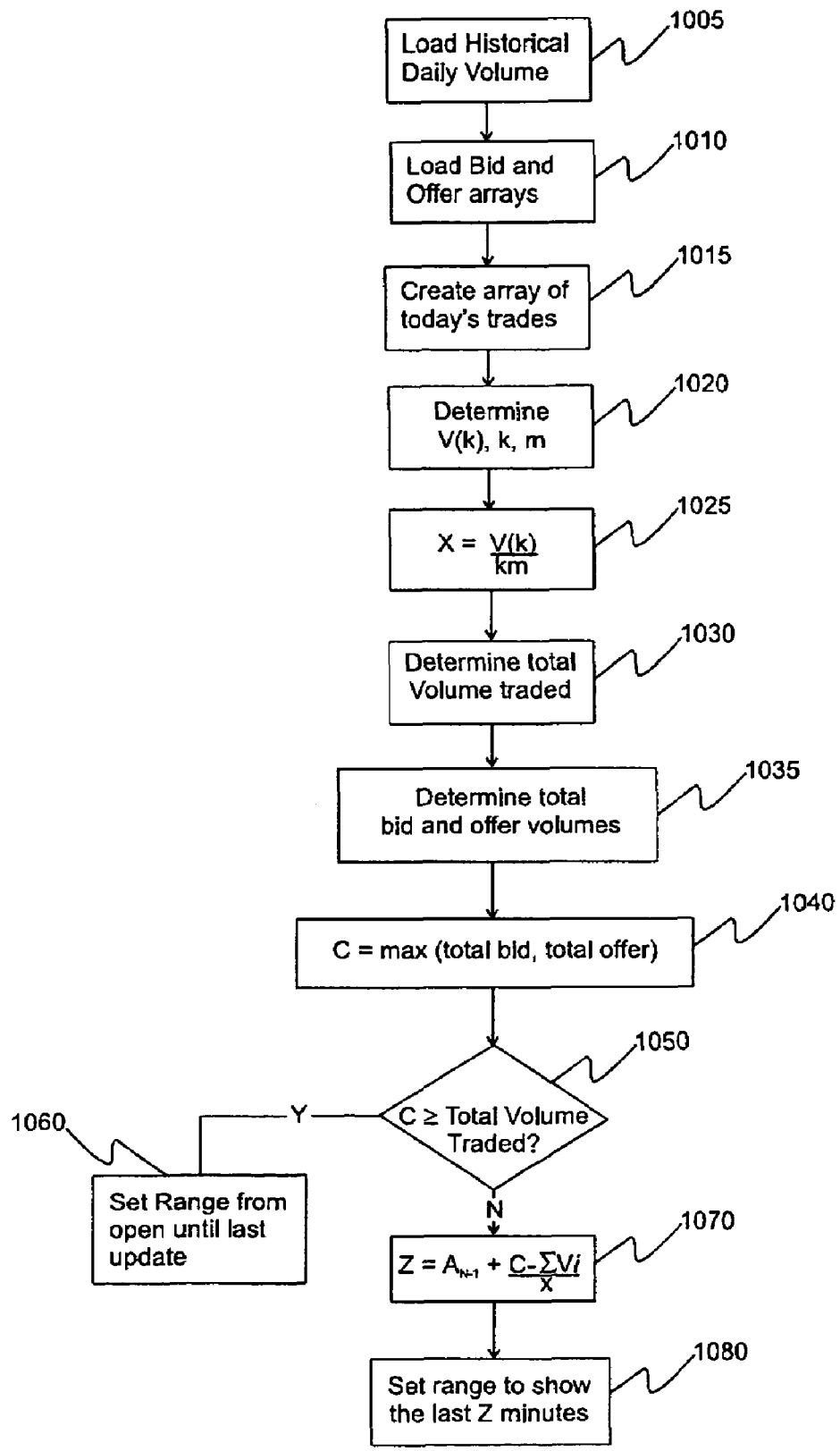
FIG. 10 is a flowchart showing steps of a method employed by a further alternate embodiment for determining the horizontal scale of the market activity analysis display.

FIG. 10 is a flow diagram showing the operation of software used in an alternate preferred embodiment to set the scale of the horizontal time axis 435 to include in the allotted space the amount of time Z to execute the volume in the bid or offer arrays based on the most recent set of trades in the same trading session. In step 1005, the system accesses historical daily volume data and in step 1010 the system accesses the arrays of executable bids and offers. In step 1015, software of this preferred embodiment creates an array of all trades in the current session that starts with the most recent trade and includes the trade's volume and age in minutes ($V_i$, $A_i$). In step 1020, the software determines the total volume traded in the security in the last k days V(k) and the number of minutes in a trading day m. In step 1025, the recent average trading volume by minute x is calculated as $$x = \frac{V(k)}{km}.$$

In step 1030, the total volume traded in the present session is calculated from the session trade history array as $$\sum_{i=1}^{N} V_i,$$

and in step 1035, the total volumes of the bid and offer arrays are calculated as $$\sum_{i=1}^{N} V_{B_i} \text{ and } \sum_{i=1}^{N} V_{O_i},$$

respectively. In step 1040, the software determines the larger total volume between the bid and offer array as $$C = \max\left(\sum_{i=1}^{N} V_{O_i}, \sum_{i=1}^{N} V_{B_i}\right).$$

In step 1050, C is compared to the total volume traded in the present session; if C is greater than or equal to the total volume for the day, the horizontal time axis 435 is scaled in step 1060 to include in the allotted space the entire trading day up to the last price update. If not, in step 1070 the software calculates the expected number of minutes Z it will take to execute the volume in the bid or offer arrays based on the most recent trades as:

$$Z = A_{N-1} + \frac{C - \sum_{i=1}^{N-1} V_i}{x},$$

where $N = N(C)$ is chosen so that $C \in \left(\sum_{j=1}^{N-1} V_j, \sum_{j=1}^{N} V_j\right)$.

In step 1080, the software sets the horizontal time axis 435 in the market activity analysis display to include in the allotted space the last Z minutes of trading activity.

Figure 11:
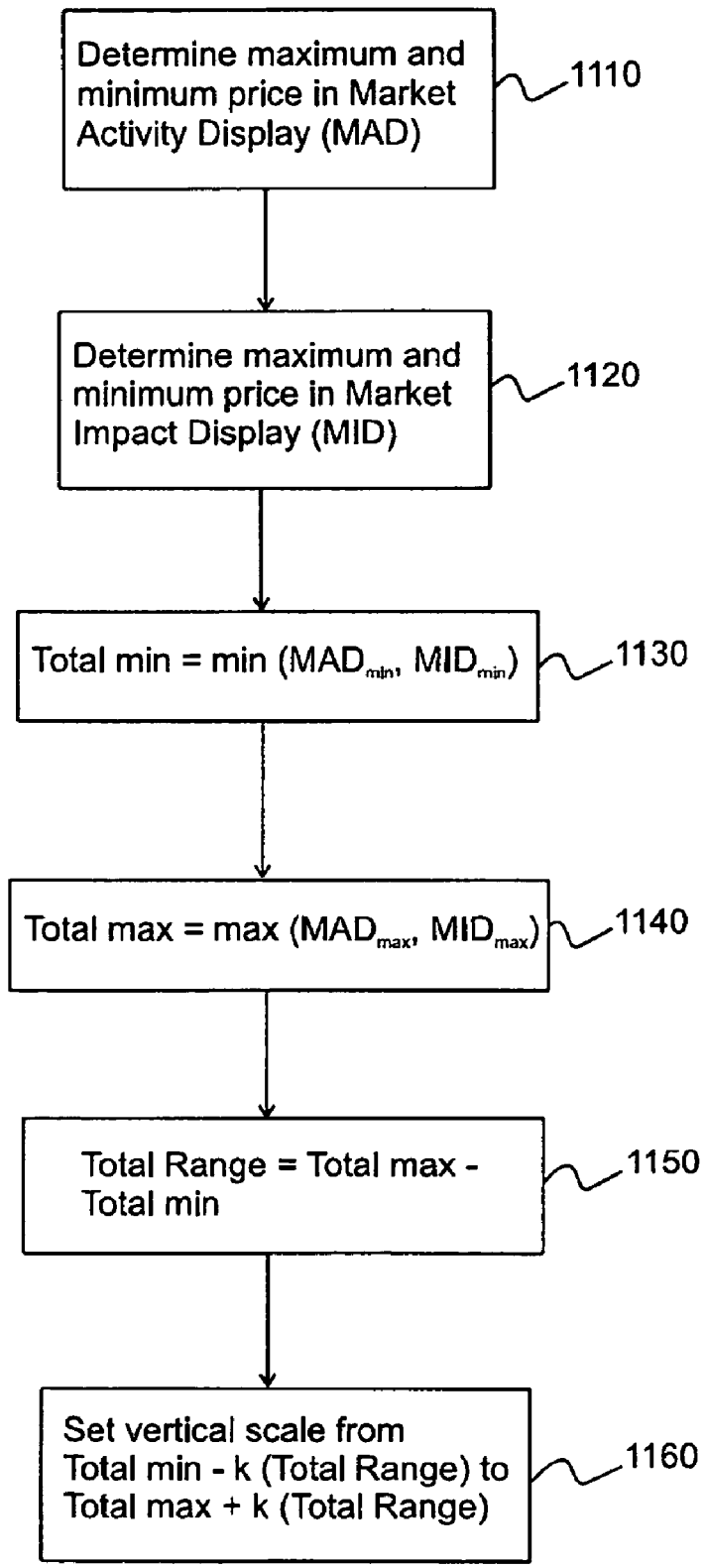
FIG. 11 is a flowchart showing steps of a method of a preferred embodiment for determining the scale for the vertical price axis common to both the market activity analysis display and the market impact analysis display.

The vertical price scale 425 is common to both displays and, in the preferred embodiment depicted in FIG. 4, it is set at round increments around the minimum and maximum price data points of the two graphs. FIG. 11 is a flow diagram showing the operation of software used in the preferred embodiment to set the vertical price scale 425 in this manner. In step 1110, software of a preferred embodiment determines the maximum and minimum prices of data points in the market activity analysis display for the time period that is to be displayed, and in step 1120, the software determines the maximum and minimum prices of data points in the market impact analysis display for the range of trade sizes that is to be displayed. In step 1130, the total minimum price is set at the lower of the minimum market impact price and the minimum market activity price. In step 1140, the total maximum price is set at the higher of the maximum market impact price and the maximum market activity price, and in step 1150, the total range is set at the difference between the total maximum and the total minimum. This scale is reset if market activity takes either display out of the previous range. To provide a consistent visual reference, the graph is not re-scaled continuously, so in the preferred embodiment the vertical price scale 425 is set with a cushion of a multiple of the data price range as shown in FIG. 4. In step 1160, the vertical scale is set to display a range from total minimum−k (total range) up to total maximum+k (total range).

Figure 5:
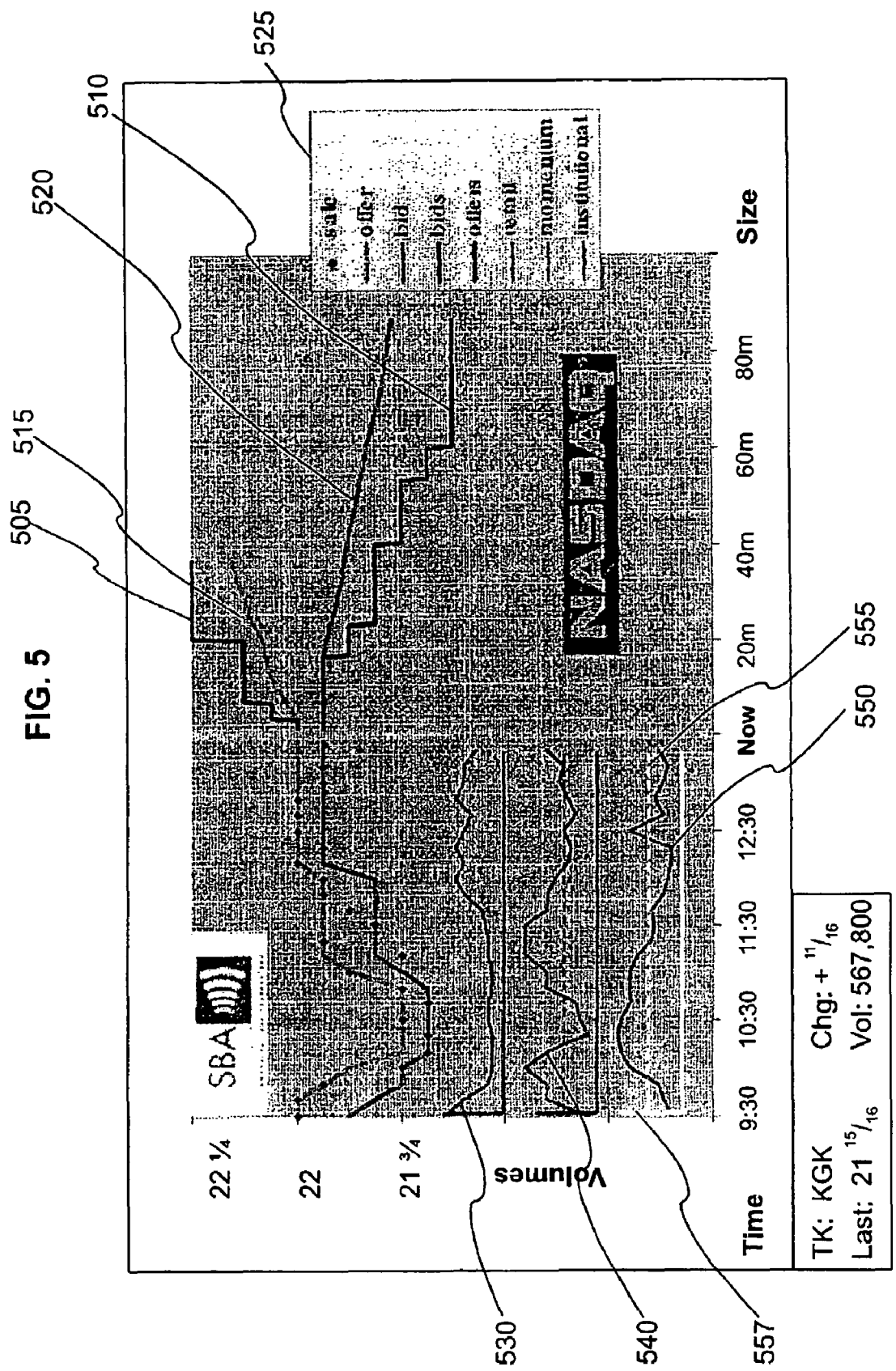
FIG. 5 is a depiction of a main display of a preferred embodiment that comprises an enhanced display of intra-day market activity information.

FIG. 5 depicts an alternate preferred embodiment of the subject invention which includes enhanced displays of both market activity and market impact analysis. The market impact analysis display comprises the expected execution offer curve 515 and bid curve 520 which are identical to curves 415 and 420 in FIG. 4, and also includes a marginal execution price display for the bid 510 and offer 505 interests. This marginal execution price as a function of trade size represents the price at which an incremental share would be executed on a market order of that trade size. The flow diagram in FIG. 8 that describes the software operations to produce the expected average execution curves also applies to the production of the marginal execution price curves. At step 805, the system host accesses the book of executable orders and in step 810, the software creates a volume counter x and sets it to zero. In step 815, the orders are placed in arrays of price, volume, and minimum size ($P_i$, $V_i$, $M_i$) by execution priority, and in step 820 the volume is incremented. In step 825 the software then determines N(x), A, and $M_N$ from the offer array as follows:

$$N = N(x) \text{ is chosen so that } x \in \left(\sum_{i=1}^{N-1} V_i, \sum_{i=1}^{N} V_i\right),$$

$$A = \sum_{i=1}^{N-1} V_i, \text{ and}$$

$M_N$ = minimum quantity of offer N.

In step 830 the software determines whether $x < A + M_N$. If so, then offer N is removed from the array in step 835, and the software determines in step 840 whether it was the last order in the offer array. If it was not the last order, then the software repeats the loop starting with step 825. If offer N was the last order in the offer array, then in step 845 the marginal execution price h(x) for a market order to buy x shares is determined not to exist. If in step 830 the software determined that $x \geq A + M_N$, then in step 850 the software calculates the marginal execution price h(x) for a market order to buy x shares as $h(x) = P_N$.

The software then performs the same marginal execution price analysis on the bid array for a sell order of volume x. In step 855, the software determines N(x), A, and $M_N$ from the bid array as described above. In step 860 the software determines whether x<A+MA. If so, bid N is removed from the array in step 865, and the software determines in step 870 whether it was the last order in the bid array. If it was not, then the software repeats the loop starting with step 855. If bid N was the last order in the array, in step 875 marginal execution price h(x) for a market order to buy x shares is determined not to exist. If in step 860 the software determined that $x \geq A + M_N$, then in step 880 the software calculates the marginal execution price function h(x) for a market order to sell x shares to the bid array in the manner described above. In step 885, the software determines whether the volume counter x has reached the total volume of the order book. If it has not, the outer loop is performed again starting at step 815, where the offer and bid arrays are reconstructed, replacing any order which had been removed; if it has, the marginal execution price display is plotted in step 890.

Figure 7:
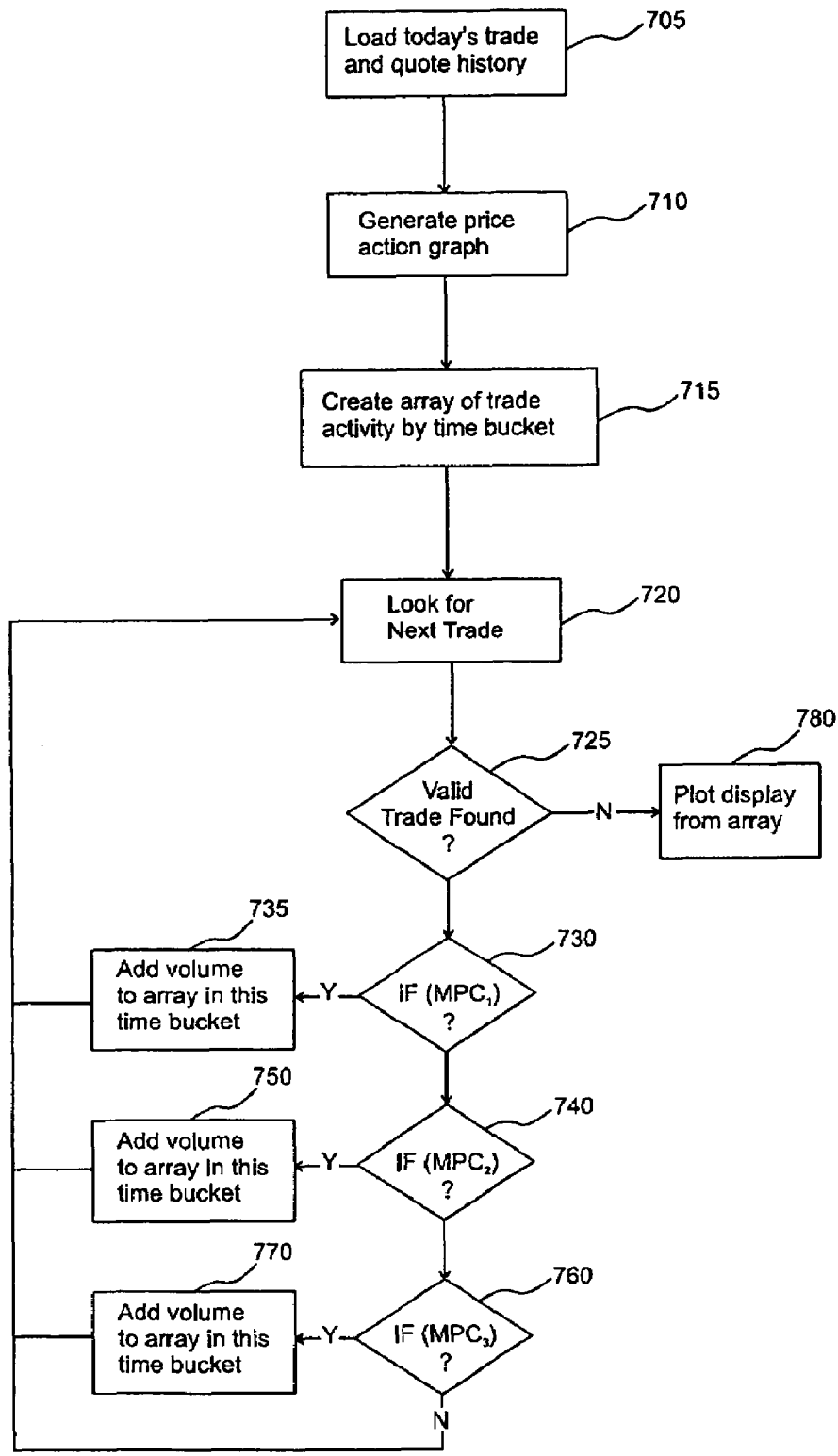
FIG. 7 is a flowchart showing steps of a preferred method of producing a market activity analysis display.

The alternate preferred embodiment shown in FIG. 5 also includes enhanced market activity analysis. As can be seen in FIG. 5, there are graphs (530, 540, 550) of trading activity for different classes of market participant; these graphs share the horizontal time axis with the price information above, but have separate vertical volume axes 557 for each different class. The different market participant classes are identified in the display legend 525, and each trading activity graph (530, 540, 550) includes an average volume indicator 555 to provide a reference point in visually analyzing the variance of trading activity over time. FIG. 7 is a flow diagram showing the operation of software used in the preferred embodiment to generate the market activity analysis depicted in FIG. 5. At step 705, the system host accesses the trading and quote history for the day, including the time, price, volume, and pre-defined class of executing broker of all trades as well as the best bid and best offer posted at every time during the trading day. In step 710, the host generates the price action graph depicted in FIG. 4; as discussed above, methods of generation of a graph from the consolidated tape are known in the art. In step 715, the system creates an array which separates the trading day into small time buckets; for each time bucket i there will be a volume for each market participant class ($MPC_{1_i}$, $MPC_{2_i}$, $MPC_{3_i}$). In step 720, the system looks for the next trade and in step 725 checks whether a valid trade has been found.

If a valid trade is found, the trade data are separated using an Indicative Formula (IF) for each market participant class. For example, a system-configurable IF to identify institutional trades might include only block trades greater than a given volume, such as 110,000 shares. An IF to identify retail trades might include only trades by certain brokers such as Charles Schwab whose main order flow is from retail clients, or it may include only trades below a certain volume, such as 1,000 shares. In step 730, the trade is tested against the IF for the first MPC, and if the trade satisfies the criteria, the trade is added in step 735 to the volume total for that MPC in the appropriate time bucket, and the software returns to step 720 to look for another trade. Similarly, in step 740 the trade is tested against the IF for the second MPC, and if the trade satisfies the criteria, the trade is added in step 750 to the appropriate MPC and time bucket of the array, and the software returns to step 720 to look for another trade. Likewise, steps 760 and 770 do the same for the third MPC. Eventually the end of the available trades is reached and the valid trade test in step 725 is failed. In step 780, the software then plots the display from the arrays using the appropriate scaling algorithm.

Figure 6:
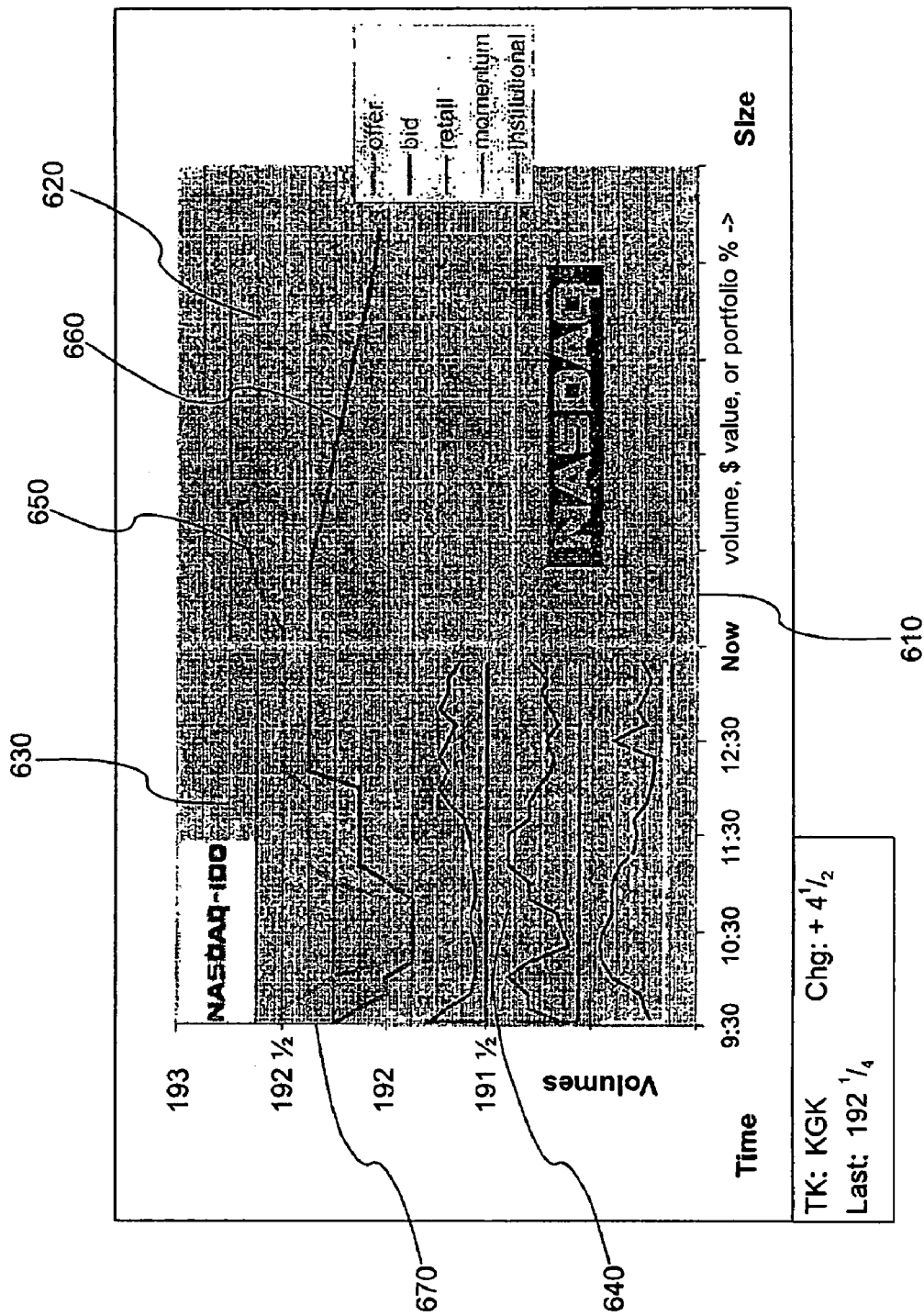
FIG. 6 is a depiction of a main display of a preferred embodiment that comprises an enhanced display that expresses trade size in dollar value or portfolio proportion.

FIG. 6 depicts an alternate preferred embodiment of the subject invention which is applicable not only to individual stocks but also to a portfolio of stocks or to an index. In this embodiment the user is permitted to choose whether to denominate the horizontal trade size axis 610 of the market impact analysis 620 in volume, notional value, or proportion of portfolio. Denomination of the horizontal trade size axis 610 in volume results in a market impact analysis similar to that illustrated in FIG. 4, where the trade size axis 430 increments represent number of shares traded and the vertical price scale 425 is denominated in share price.

In the preferred embodiment depicted in FIG. 6, the user can also choose to denominate the horizontal trade size axis 610 in notional value. If the preferred embodiment is used to analyze an index, the software will determine the basket of stocks which replicates the index at the specified notional value, as is well known in the art. For example, the Dow Jones Industrial Average is calculated from the last sale price of 30 stocks and the Standard & Poor's 500 is calculated from 500 stocks. Constructing a basket of stocks which replicates these indices from their respective component weightings is well known in the art. The market activity analysis 630 calculates the trading activity breakdown by market participant class 640 for each component of the index, then aggregates the component volumes to an index trading activity breakdown, using the component weightings as is well known in the art. If the preferred embodiment is used to analyze an index, the offer 650 and bid 660 market impact curves represent the index level in dollars at which the user should expect to execute an order in the index, as a function of the notional value executed. To calculate the index level for a given notional trade size, the notional amounts of each component security is determined from the total trade notional value and the component weighting in the index. The component security notional amounts are then converted into component security volumes using the last trade prices for each security, the expected market impact prices for those volumes are calculated as shown in FIG. 8, and these prices are aggregated back to an index price using the index weightings. Display of the market impact analysis using notional value denomination of the horizontal trade size axis 610 is extremely useful in certain trading situations. For example, index tracking fund managers will frequently be forced to decide when to execute a certain notional value of portfolio adjustment. This adjustment will entail sending orders in all the individual index component securities, however, so without the novel price impact aggregation described above, expected execution price would be difficult to determine.

In the preferred embodiment depicted in FIG. 6, the user can also choose to denominate the horizontal trade size axis 610 in proportion of a portfolio. This requires the user to first input their present holdings in the various securities comprising their portfolio, after which the system will scale the horizontal axis 610 to fit the range of 1-100% in the allotted space. If the preferred embodiment is being used to analyze an index, the vertical axis 670 will be denominated in execution price as shown in FIG. 6. To calculate the market impact curves 650, 660 for a given portfolio percentage, the component security volumes are determined from the total holdings and the portfolio percentage. The individual expected market impact prices for those volumes are calculated as shown in FIG. 8, and these prices are aggregated back to an index price using the index weightings.

In the preferred embodiment depicted in FIG. 6, the invention can also be used to analyze a user-defined basket of securities. The vertical axis 670 is then denominated in the notional value of the portfolio, and the market impact curves 650, 660 represent the expected portfolio market value which would result from an order to buy or sell a percentage of the portfolio, as a function of the percentage executed. To calculate the market impact curves 650, 660 for a given portfolio percentage, the component security volumes are determined from the total holdings and the portfolio percentage. The individual expected market impact prices for those volumes are calculated as shown in FIG. 8, and these prices are aggregated back to an expected portfolio market value using the original portfolio holdings. Display of the market impact analysis using portfolio percentage denomination of the horizontal trade size axis 610 can be extremely useful in certain trading situations. For example, a market impact analysis denominated in this way is ideal for institutional program trading desks attempting to liquidate large portfolios purchased from their clients.

The user input/output to determine choice of axis denomination and present holdings is accomplished using standard interface means as is well known in the art.

Figure 12:
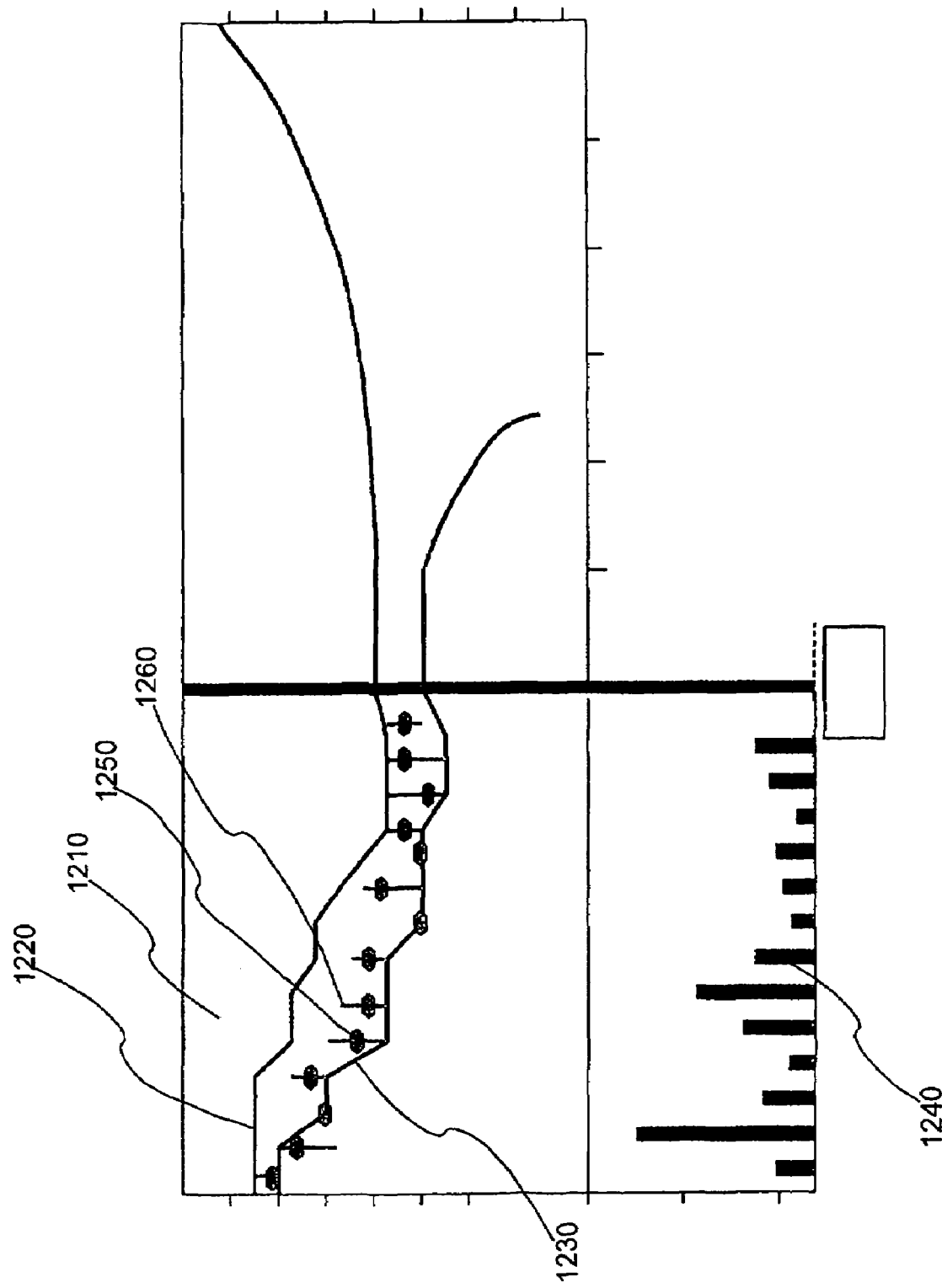
FIG. 12 is a depiction of a main display of a preferred embodiment that additionally comprises relative price information in the market activity analysis.
Figure 13:
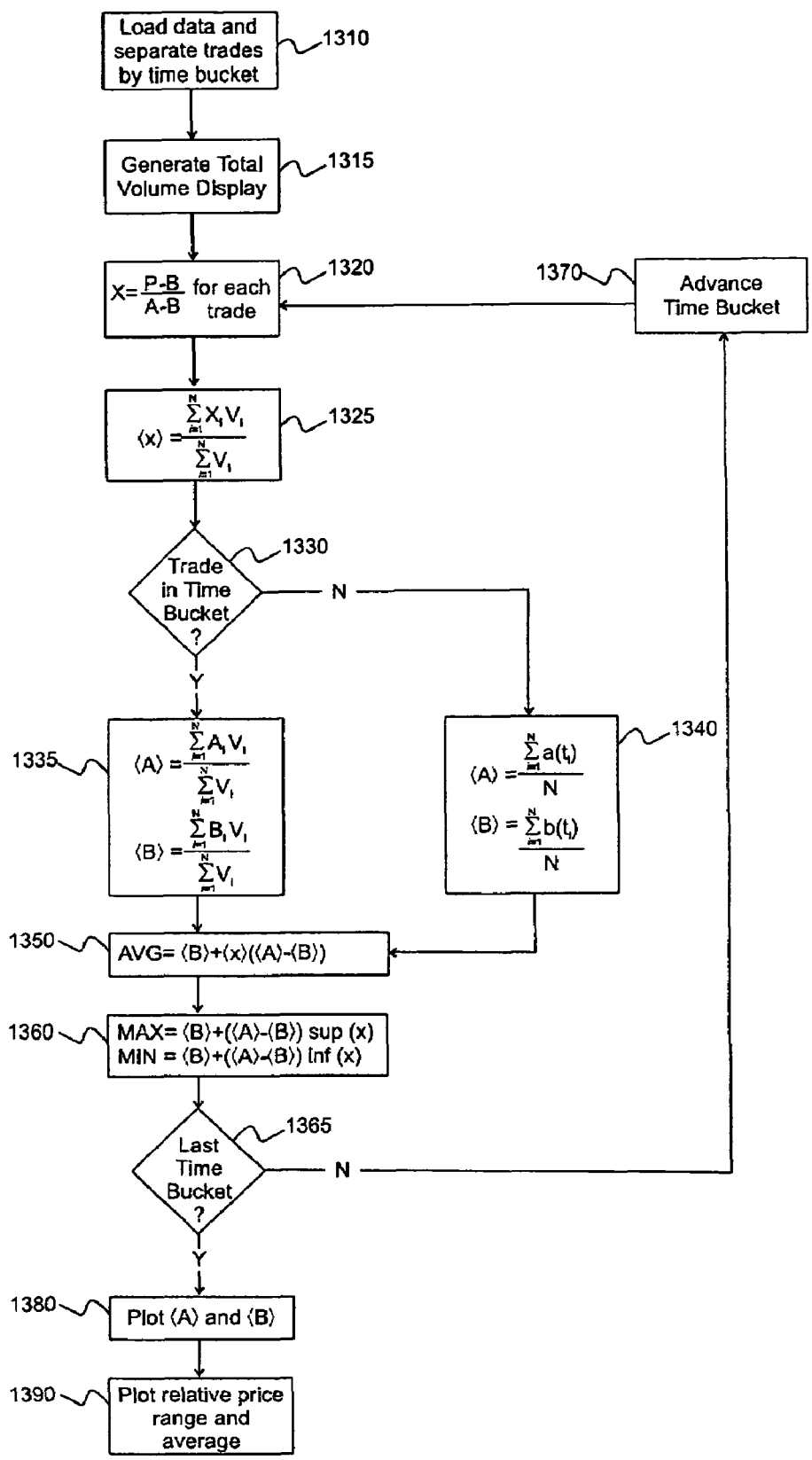
FIG. 13 is a flowchart showing steps of the method employed by an alternate embodiment for generating the relative price information in the market activity analysis.

FIG. 12 depicts an alternate preferred embodiment of the subject invention which includes a novel display of trade activity in each time bucket. The market activity analysis 1210 comprises an average best offer curve 1220, an average best bid curve 1230, a time bucketed total volume display 1240, discrete indications 1250 of the average relative trade rice, and a vertical bar 1260 expressing the range of relative prices in the time bucket. FIG. 13 is a flow diagram showing the operation of software used in a preferred embodiment to generate the market activity analysis depicted in FIG. 12. In step 1310, the preferred embodiment accesses historical market data including best bid and offer, trade time, price P, volume V, and the most recent available bid B and ask A preceding each trade. The preferred embodiment separates all historical trades into time buckets, and in step 1315 the time bucketed total volume display 1240 is generated from this data as is well known in the art.

The software of the preferred embodiment then performs a loop of operations on each time bucket, starting with the first. In step 1320 the preferred embodiment calculates the relative price $x_i$ of each trade in the time bucket from the trade price $P_i$, and the bid $B_i$ and the offer $A_i$ immediately preceding that trade as:

$$x_i = \frac{(P_i - B_i)}{(A_i - B_i)}.$$

In step 1325, the preferred embodiment then calculates the average relative price $<x>$ over that time bucket, weighted by trade volume, as:

$$<x> = \frac{\sum_{i=1}^{N} x_i V_i}{\sum_{i=1}^{N} V_i}.$$

In step 1330, the preferred embodiment determines if there are any trades in the time bucket. If so, in step 1335 the volume weighted average best bid $<B>$ and volume weighted average best offer $<A>$ are calculated for the N trades in the time bucket.

$$<A> = \frac{\sum_{i=1}^{N} A_i V_i}{\sum_{i=1}^{N} V_i}, \quad <B> = \frac{\sum_{i=1}^{N} B_i V_i}{\sum_{i=1}^{N} V_i}.$$

It there are no trades in the time bucket, in step 1340 $<B>$ and $<A>$ are calculated as the average of the best available bid $b(t)$ and offer $a(t)$ among N time samples in that time bucket.

$$<A> = \frac{\sum_{i=1}^{N} a(t_i)}{N}, \quad <B> = \frac{\sum_{i=1}^{N} b(t_i)}{N}.$$

In step 1350, the average trade price AVG for the time bucket is calculated by scaling the average relative price to the spread between the average bid and average ask.

$AVG=<B>+<x>(<A>-<B>)$

In step 1360, the largest MAX and smallest MIN value of x in the time bucket is scaled to the spread between the average bid and average ask.

$MAX=<B>+(<A>-<B>)sup(x)$, and $MIN=<B>+(<A>-<B>)inf(x).$

In step 1365, the software of the preferred embodiment determines whether the last time bucket has been reached. If the last time bucket has not been reached, the software advances one time bucket in step 1370 and begins the operation loop in step 1320. If the last time bucket has been reached, then the software advances to step 1380, where the average bid curve 1230 and the average offer curve 1220 are constructed by plotting $<B>$ and $<A>$ over time. In step 1390, the preferred embodiment represents the relative trade values in the form of a vertical bar 1260 extending from MIN to MAX and a diamond shape 1250 at AVG overlapping this vertical bar. The placement of the AVG diamond 1250 gives the user an instant graphical understanding of the extent to which trades have tended to cluster near the bid ($<x>\sim 0$) or near the ask ($<x>\sim 1$). For a time bucket in which there was only one trade, the values MIN, MAX, and AVG are all equal (i.e., the vertical bar 1260 does not exist and only the diamond shape 1250 is displayed). For a time bucket in which there were no trades, there is no vertical range bar 1260 or discrete average indication 1250. If none of the trades in a certain time bucket occur at the bid or offer, the vertical bar 1260 will not extend all the way to the average best bid curve 1230 or the average best offer curve 1220. The resultant gap will therefore communicate in graphic clarity to the user of the preferred embodiment valuable market intelligence regarding the participation of market makers in trading activity in that time bucket.

Figure 14:
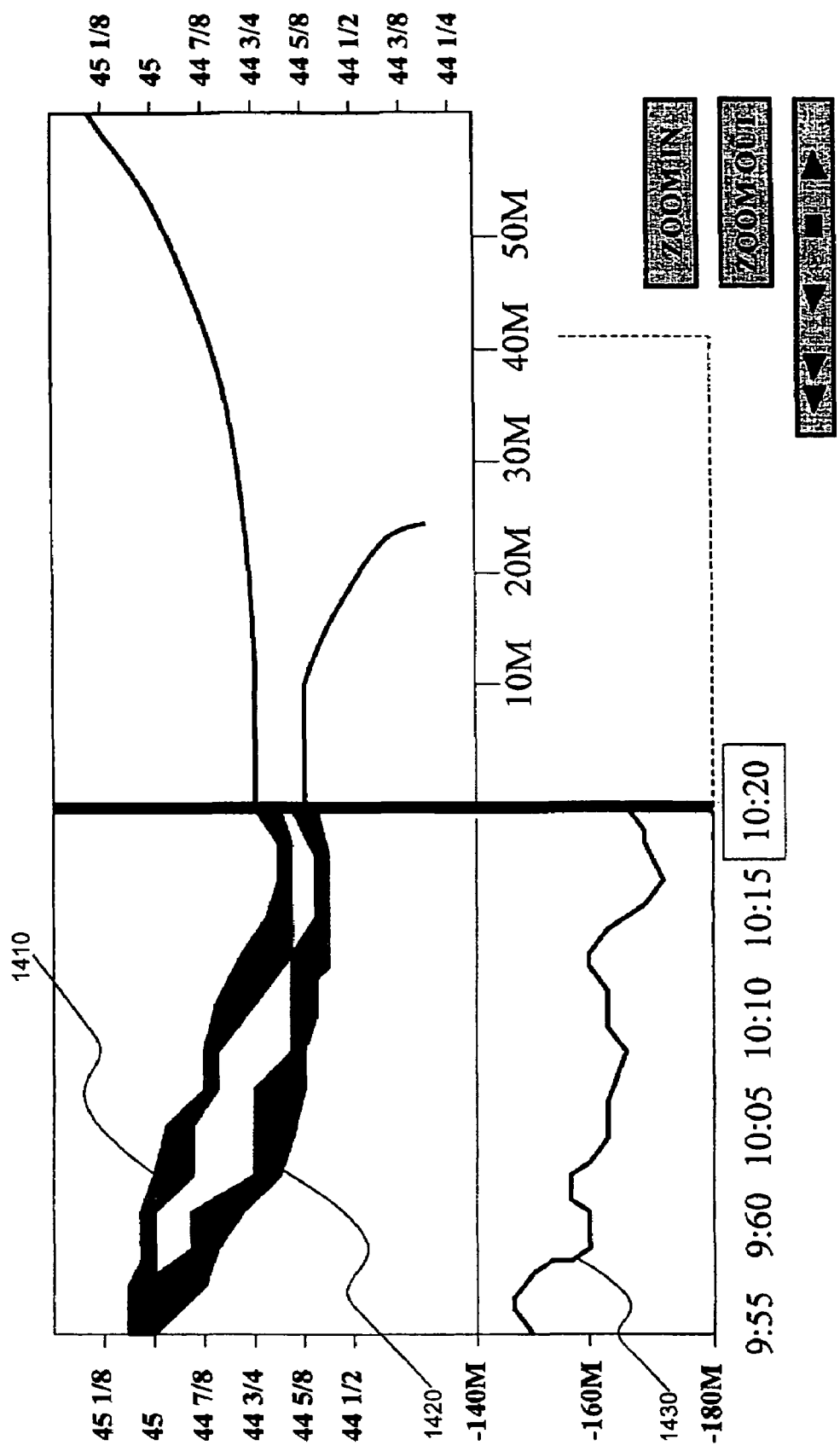
FIG. 14 is a depiction of a main display of a preferred embodiment that additionally comprises displays of market maker price range and estimated change in dealer inventory in the trading activity analysis.

FIG. 14 depicts an alternate preferred embodiment of the subject invention which includes a different novel display of trade activity. The offer range 1410 represents the range from the minimum to maximum market maker offers at a given time, and is shaded red to illustrate the expressed executable selling interest. Likewise, the bid range 1420 represents the range from the minimum to maximum market maker bids at a given time, and is shaded blue to illustrate the expressed executable buying interest. This representation can be very useful to retail or other users who wish to judge how their execution price compares to the other quotes that were available when the trade was executed.

The preferred embodiment depicted in FIG. 14 also includes a graph of the evolution of the estimated combined inventories of the registered market makers in the security. This estimated change in inventory graph 1430 represents an estimate of the total net volume traded by market makers in the present trading session as a function of time. The net volume traded by market makers is equal to the total volume bought minus the total volume sold. The total volume bought by market makers in this session is estimated by calculating the total volume of trades executed at the same price as the best dealer bid at the time of the trade. The total volume sold by market makers in this session is estimated by calculating the total volume of trades executed at the same price as the best dealer offer at the time of the trade. The difference is plotted in the estimated change in inventory graph 1430. This feature clearly displays trends and patterns in the tendency of trades to take place on the bid or the offer. The display can also provide valuable insight into the trading behavior of market makers if, for example, the estimated change in inventory graph 1430 is dramatically negative and market makers have been forced to significantly deplete their inventory of the security.

While the embodiments shown and described are fully capable of achieving the objects of the invention, it is to be understood that these embodiments are shown only for the purpose of illustration and not for the purpose of limitation.

What is claimed is:

1. A method of displaying data regarding one or more electronic securities-trading markets to a user computer, comprising:
    (a) electronically receiving over a computer network a request from the user computer to view information on a security or group of securities traded on one or more electronic securities-trading markets;

(b) electronically receiving over a computer network data describing the liquidity conditions in said electronic securities-trading markets;

(c) electronically storing said received data describing the liquidity conditions in said electronic securities-trading) markets;

(d) calculating in real time a market impact analysis display for said security or group of securities, based on said received data describing said liquidity conditions in said securities-trading markets that displays projected market impact as a function of trade size in two or more piecewise-continuous curves comprising at least one curve that is a function of trade size for user bids trading with a book of executable offers and at least one curve that is a function of trade size for user offers trading with a book of executable bids; and (e) transmitting said market impact analysis display or data sufficient to generate said market impact analysis display to said user computer.

2. The method of claim 1 further comprising the steps of (a) receiving and storing data describing intra-day trading activity in said security on said electronic securities-trading markets;

(b) calculating an intra-day trading activity analysis display; and (c) transmitting said display to said user computer.

3. The method of claim 1 further comprising the step of updating, either periodically or continuously, said market impact analysis display transmitted to said user computer, based on real-time data received from said markets.

4. The method of claim 2 further comprising the step of updating, either periodically or continuously, said intra-day trading analysis display transmitted to said user computer, based on real-time received data from said markets.

5. The method of claim 2 wherein said market impact analysis display and said intra-day trading analysis display are displayed in a single split display.

6. The method of claim 2 wherein said intra-day trading analysis display comprises a display that shows trade data for one or more market participant classes.

7. The method of claim 1 wherein said group of securities is a published index of securities.

8. The method of claim 1 wherein said group of securities is a user-defined basket of securities.

9. The method of claim 1 wherein said calculations to generate said market impact analysis display incorporate user trading costs.

10. The method of claim 2 wherein said intra-day trading activity analysis display also calculates and displays information regarding the price of trading activity relative to the best executable order prices.

11. The method of claim 2 wherein said intra-day trading activity analysis display also displays information regarding a range of market maker bids and a range of market maker offers.

12. The method of claim 2 wherein said intra-day trading activity analysis display also calculates and displays information regarding the estimated change in market maker inventory.

13. A method as in claim 1, wherein said two or more piecewise continuous are generated by:

(a) filling a hypothetical order using booked executable orders; and (b) calculating a weighted average price at which said hypothetical order would be executed.

14. A computer program, stored on a computer readable medium, for displaying data regarding one or more electronic securities-trading markets to a user computer, said program comprising:

(a) software, stored on a computer readable medium, for electronically receiving over a computer network data describing liquidity conditions in said one or more electronic securities-trading markets;

(b) software, stored on a computer readable medium, for electronically storing said received data describing the liquidity conditions in said one or more electronic securities-trading markets;

(c) software, stored on a computer readable medium, for electronically storing said received data describing the liquidity conditions in said one or more electronic securities-trading markets;

(d) software, stored on a computer readable medium, for calculating in real time a market impact analysis display for said security or group of securities, based on said received data describing said liquidity conditions in said securities-trading markets that displays projected market impact as a function of trade size in two or more piecewise-continuous curves comprising at least one curve that is a function of trade size for user bids trading with a book of executable offers and at least one curve that is a function of trade size for user offers trading with a book of executable bids; and (e) software, stored on a computer readable medium, for transmitting said market impact analysis display or data sufficient to generate said market impact analysis display to said user computer.

15. The program of claim 14 further comprising software, stored on a computer readable medium, for:

(a) receiving and storing data describing intra-day trading activity in said security on said electronic securities-trading markets;

(b) calculating an intra-day trading activity analysis display; and (c) transmitting said display to said user computer.

16. The program of claim 14 further comprising software, stored on a computer readable medium, for updating, either periodically or continuously, said market impact analysis display transmitted to said user computer, based on real-time data received from said markets.

17. The program of claim 15 further comprising software, stored on a computer readable medium, for updating, either periodically or continuously, said intra-day trading analysis display transmitted to said user computer, based on real-time received data from said markets.

18. The program of claim 15 wherein said market impact analysis display and said intra-day trading analysis display are displayed in a single split display.

19. The program of claim 15 wherein said intra-day trading analysis display comprises a display that shows trade data for one or more market participant classes.

20. The program of claim 14 wherein said group of securities is a published index of securities.

21. The program of claim 14 wherein said group of securities is a user-defined basket of securities.

22. The program of claim 14 wherein said calculations to generate said market impact analysis display incorporate user trading costs.

23. The program of claim 15 wherein said intra-day trading activity analysis display also calculates and displays information regarding the price of trading activity relative to the best executable order prices.

24. The program of claim 15 wherein said intra-day trading activity analysis display also displays information regarding a range of market maker bids and a range of market maker offers.

25. The program of claim 15 wherein said intra-day trading activity analysis display also calculates and displays information regarding the estimated change in market maker inventory.

26. A computer program, stored on a computer readable medium, for displaying data regarding one or more electronic securities-trading markets to a user computer, said program comprising:
- (a) software, stored on a computer readable medium, for receiving and storing a user request for information on a security or group of securities traded on said electronic securities-trading markets;
- (b) software, stored on a computer readable medium, for transmitting said user request over a computer network to a remotely located computer;
- (c) software, stored on a computer readable medium, for receiving and storing data comprising a market impact analysis display for said security that displays projected market impact as a function of trade size in two or more piecewise-continuous curves comprising at least one curve that is a function of trade size for user bids trading with a book of executable offers and at least one curve that is a function of trade size for user offers trading with a book of executable bids; and
- (d) software, stored on a computer readable medium, for displaying said received market impact analysis display on said user computer.

27. A computer program, stored on a computer readable medium, for displaying data regarding one or more electronic securities-trading markets to a user computer, said program comprising:
- (a) software, stored on a computer readable medium, for receiving and storing a user request for information on a security or group of securities traded on said electronic securities-trading markets;
- (b) software, stored on a computer readable medium, for transmitting said user request over a computer network to a remotely located computer;
- (c) software, stored on a computer readable medium for receiving and storing data sufficient to generate a market impact analysis display for said security that displays projected market impact as a function of trade size in two or more piecewise-continuous curves comprising at least one curve that is a function of trade size for user bids trading with a book of executable offers and at least one curve that is a function of trade size for user offers trading with a book of executable bids;
- (d) software, stored on a computer readable medium, for generating and said market impact analysis display, based on data received over said computer network from said remotely located computer; and
- (e) software, stored on a computer readable medium, for displaying said market impact analysis display on said user computer.

* * * * *